United States Patent Office 3,336,473
Patented Aug. 15, 1967

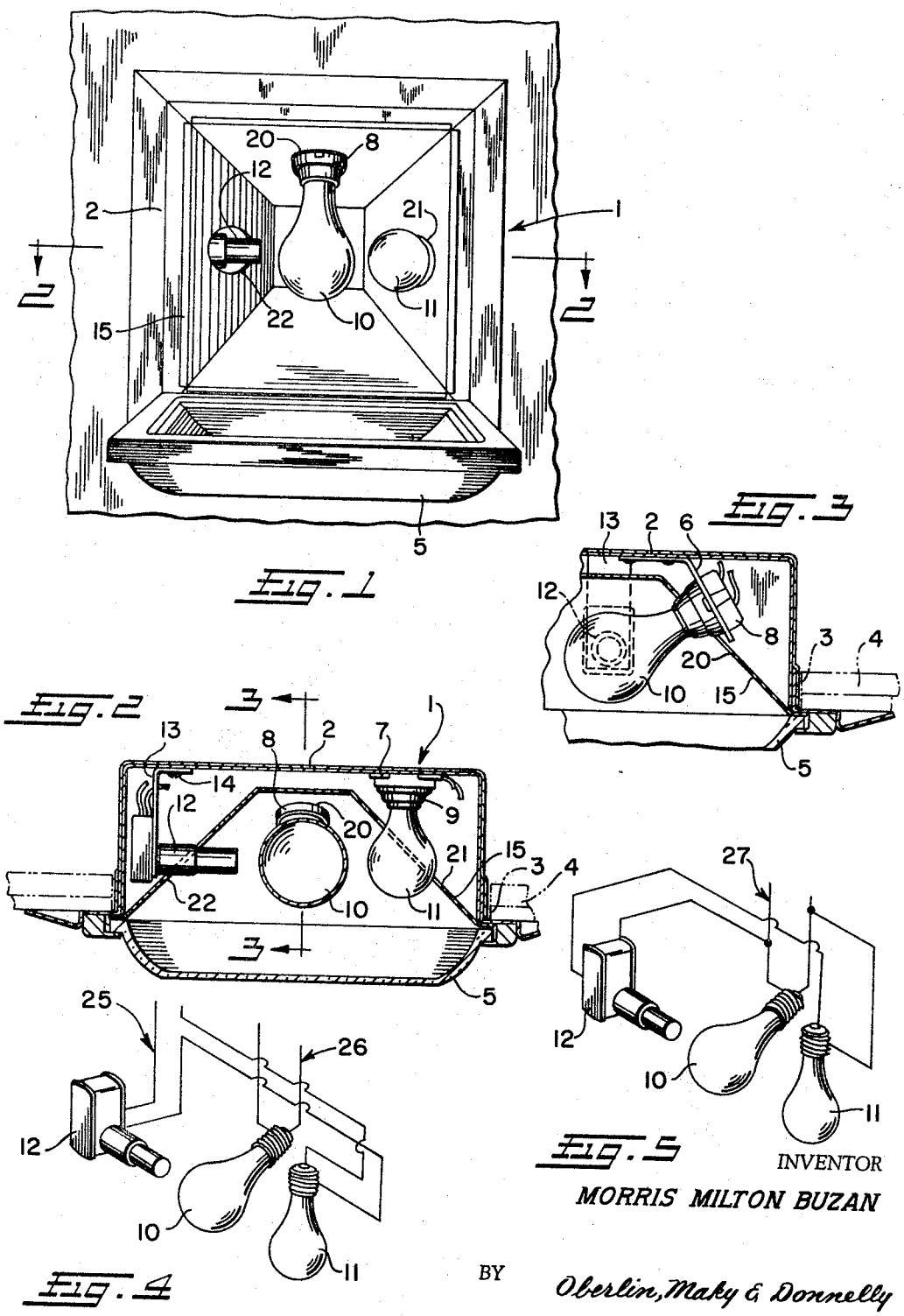

3,336,473
LIGHTING FIXTURE WITH AUXILIARY LAMP
Morris Milton Buzan, Westlake, Ohio, assignor to Art Metal Lighting Division, Wakefield Corporation, Cleveland, Ohio, a corporation of Ohio
Filed Sept. 13, 1965, Ser. No. 486,911
8 Claims. (Cl. 240—37.1)

ABSTRACT OF THE DISCLOSURE

A lighting fixture having an auxiliary lamp which is instantly turned on by a light sensitive switching device in response to the light intensity from the main lamp dropping below a predetermined level, thereby providing illumination at all times of an intensity at least as great as the auxiliary lamp.

Disclosure

The present invention relates, as indicated, to a lighting fixture with auxiliary lamp, especially of the type which is automatically lighted when the primary lamp fails, thereby ensuring continuous illumination at all times.

One of the main objections to the use of incandescent lighting in office buildings, apartments, factories, and even in homes is the relatively short life of the lamp itself. A burned out lamp can and often does cause a very hazardous darkened condition to exist, especially when located in dark hallways, stairways, exits, etc. Accordingly, many lighting systems now being installed include in addition to the main lamps a plurality of emergency or auxiliary lamps, usually one for each main lamp, and means for switching on the auxiliary lamps when the main lamps are out, whether due to burn out, breaking, or a power failure.

In the past, switching of the auxiliary lamps has been accomplished either manually or by providing a current sensing device which is actuated when the main lamp fails. However, heretofore lighting fixtures with auxiliary lighting systems contained therein including an auxiliary lamp and means for automatically switching on the auxiliary lamp when the main lamp is out have not been provided, which is a principal object of the present invention.

Another object is to provide a lighting fixture of the type described with a light sensitive switching device for switching the auxiliary lamp on and off, in response to unlighted and lighted conditions, respectively, of the primary lamp.

A further object is to dispose the primary lamp of such lighting fixture directly between the photocell and auxiliary lamp to act as a curtain, thereby cutting down on the amount of light striking the photocell from the auxiliary lamp when the primary lamp is out and thus permitting a brighter auxiliary lamp to be used for a particular photocell than if the light from the auxiliary lamp fell directly on the photocell.

Other objects and advantages of the present invention will become apparent as the following description proceeds.

To the accomplishment of the foregoing and related ends, the invention, then comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:
FIG. 1 is a plan view of a preferred form of lighting fixture in accordance with the present invention with the glass refractor swung out of the way to permit viewing of the fixture interior;

FIG. 2 is a vertical section taken on the plane of the line 2—2 of FIG. 1;

FIG. 3 is a fragmentary vertical section taken on the plane of the line 3—3 of FIG. 2;

FIG. 4 is a schematic wiring diagram in perspective for such lighting fixture with the lamps in separate circuits; and FIG. 5 is a schematic wiring diagram similar to FIG. 4, but with the lamps in parallel in a single circuit.

Referring now more particularly to the drawing, a preferred form of lighting fixture in accordance with the present invention is generally indicated at 1. In the example shown, the lighting fixture 1 is of the recessed type; that is, the fixture pan or housing 2 is adapted to be mounted in an opening 3 in a mounting surface such as a ceiling 4 with the glass refractor 5 substantially flush with such mounting surface. However, it should be understood that the principles of the present invention are applicable to surface mounted lighting fixtures as well.

Attached to the fixture pan 2 as by means of suitable mounting brackets 6 and 7 are a pair of conventional ceramic light sockets 8 and 9, respectively, the socket 8 being adapted to receive a primary lamp 10, and the socket 9 being adapted to receive an auxiliary lamp 11. Also mounted within the pan 2 is a photocell or light sensitive switching device 12, it being supported by another bracket 13 attached to the pan 2 by suitable fasteners 14.

As clearly shown in FIGS. 1 and 2, the reflector 15 which lines the walls of the pan 2 has three openings 20, 21, and 22 therein through which the primary and auxiliary lamps 10 and 11 and light sensitive switching device 12 extend, and the mounting brackets 6, 9, and 13 are preferably located in such a manner that the primary lamp 10 is disposed directly between the switching device 12 and auxiliary lamp 11. This is an important feature, as will become apparent in the discussion which follows.

The primary lamp 10, when lighted, provides the required illumination for a particular area, such as a room, hallway, stairway, or exit, and may be of the incandescent type at a typical line voltage of 120 volts A.C., or a mercury vapor lamp which would operate from an auxiliary ballasting device (not shown). The auxiliary lamp 11, on the other hand, is desirably an incandescent lamp, and of lesser wattage than the primary lamp 10, although not necessarily so, for reasons which will later become readily apparent.

Referring next to FIG. 4, the auxiliary lamp 11 and photocell 12 are shown connected in a circuit 25 separate from the primary circuit 26 for the primary lamp. Thus, should a break occur in the primary circuit 26 for any reason, this will not affect the secondary circuit 25, or the actuation of the auxiliary lamp 11 by the photocell 12 when the primary lamp 10 is out. However, both lamps could be energized by the same circuit 27 with the lamps in parallel as shown in FIG. 5, which is generally the case if incandescent lamps having a relatively short life are being used.

The photocell 12 acts in the nature of a relay, it being responsive to light emitted from the primary lamp 10 to open the secondary circuit 25, and being responsive to darkness to close the circuit 25 and thereby cause the auxiliary lamp 11 to light. The photocell 12 is desirably of the instant acting type, rather than of the delay type, so that there will be no delay between the time that the primary lamp goes out and the secondary lamp comes on.

As previously indicated, the auxiliary lamp 11 is usually of a lesser wattage than the primary lamp 10. Otherwise, the light emitted from the secondary lamp 11 could cause the photocell 12 to respond in the same manner as if the primary lamp were lighted; i.e., effect opening of the circuit 25. The result would be a flashing auxiliary lamp 11. However, the photocell 12 can be made light sensitive within a relatively narrow range, thereby permitting the wattage of the primary and secondary lamps to be quite close. Also, by disposing the primary lamp 10 directly between the auxiliary lamp 11 and photocell 12 as aforesaid, the primary lamp 10 blocks at least part of the light being emitted by the auxiliary lamp from striking the photocell, whereby a higher wattage auxiliary lamp can be used. Depending on the light blocking capability of a particular primary lamp 10 and the distance between the photocell 12 and auxiliary lamp 11, the wattage of the two lamps could be about the same, or the auxiliary lamp could even perhaps be of a higher wattage. However, oftentimes it is desirable to use an auxiliary lamp of lesser wattage so that it is readily noticeable when it is lighted, and the primary lamp is burned out and needs replacing.

If the primary lamp 10 is a mercury vapor lamp, rather than an incandescent lamp, it will not restart when turned off and then on until it has cooled sufficiently. This cooling period may take up to 20 minutes or more. During this period, however, the area normally lighted by the fixture will not be dark, since the auxiliary lamp 11 will have been actuated by the photocell 12, as discussed above.

From the foregoing discussion, it is now evident that the lighting fixture disclosed herein is unique in that it is a self-contained unit including a pair of lamps, one of which is held in reserve until the other lamp fails, at which time the one lamp is automatically lighted. The lamps are also arranged within the lighting fixture in a novel manner with respect to a light sensitive switching device. The primary lamp is disposed directly between the auxiliary lamp and the switching device to cut down on the amount of light striking the switching device from the auxiliary lamp, whereby the wattage of the auxiliary lamp may be increased without its actuating the switching device as does the main lamp.

Other modes of applying the principles of the invention may be employed, change being made as regards the details described, provided the features stated in any of the following claims or the equivalent of such be employed.

I therefore, particularly point out and distinctly claim as my invention:

1. A lighting fixture comprising a housing, a pair of lamps mounted in said housing, one of said lamps being normally lighted and the other one unlighted, and a light sensitive switching means also mounted in said housing for detecting the light intensity emitted from said one lamp, said light sensitive switching means being operative instantly to switch said other lamp on when the light intensity from said one lamp drops below a predetermined level, and instantly switch said other lamp out when the light intensity from said one lamp is above such predetermined level, thereby ensuring continuous illumination at all times of an intensity at least as great as said other lamp.

2. The lighting fixture of claim 1 wherein the light normally emitted by said other lamp is of less intensity than the light normally emitted by said one lamp, said switching means being operative in response to the greater intensity of light emitted by said one lamp to switch said other lamp off.

3. The lighting fixture of claim 1 wherein said housing is lined with a reflector, and said lamps and switching means extend through apertures in said reflector into the interior of said housing.

4. The lighting fixture of claim 1 wherein said switching means is a photocell connected in series with said other lamp.

5. The lighting fixture of claim 1 wherein said one lamp is a metallic vapor lamp and said other lamp is an incandescent lamp, said light sensitive switching means being operative instantly to switch said incandescent lamp on until said metallic vapor lamp is started and the intensity of light emitted thereby is above such predetermined level, and then instantly switch said incandescent lamp off.

6. The lighting fixture of claim 5 wherein said metallic vapor lamp is a mercury vapor lamp and said switching means is an instant acting light sensitive photocell.

7. A lighting fixture comprising a housing, a pair of lamps mounted in said housing, one of said lamps being normally lighted and the other one unlighted, and a light sensitive switching means also mounted in said housing in close relation to said one lamp for detecting the presence or absence of light being emitted therefrom, said light sensitive switching means being operatively connected to said other lamp to switch said other lamp on when said first lamp is out, and switch said other lamp out when said one lamp is lighted, thereby ensuring continuous illumination at all times by one or the other of said lamps, said one lamp being disposed directly between said switching means and said other lamp to block at least part of the light emitted by said other lamp from striking said switching means, whereby said other lamp may be of a higher intensity for a given switching means without actuating the same than if the light from said other lamp fell directly on said switching means.

8. A lighting fixture comprising a pan-shaped housing, a pair of lamp sockets, bracket means for securing said lamp sockets to said housing, a lamp in each of said sockets, one of said lamps being normally lighted and the other normally out, a photocell means, bracket means mounting said photocell means to said housing in close relation to said one lamp for detecting the presence or absence of light being emitted therefrom, said photocell means being operatively connected to said other lamp to actuate the same in response to said one lamp going out, and cause said other lamp to go out in response to said one lamp being lighted, thereby ensuring continuous illumination at all times by one or the other of said lamps, said one lamp being disposed directly between said photocell means and said other lamp to reduce the amount of light emitted by said other lamp from reaching said photocell means, thereby permitting said other lamp to be of a higher wattage than would otherwise be permitted without actuating said photocell means.

References Cited
UNITED STATES PATENTS

| | | | |
|---|---|---|---|
| 2,213,584 | 9/1940 | Hulst | 240—37.1 |
| 2,590,513 | 3/1952 | Crossley et al. | 240—37.1 |
| 3,038,062 | 6/1962 | Liberman | 240—37 |
| 3,180,978 | 4/1965 | Mas | 240—37.1 |

NORTON ANSHER, *Primary Examiner.*

W. M. FRYE, *Assistant Examiner.*